US010102218B2

(12) United States Patent
Lee et al.

(10) Patent No.: US 10,102,218 B2
(45) Date of Patent: Oct. 16, 2018

(54) FILE SYSTEM WITH PER-EXTENT CHECKSUMS

(71) Applicant: Microsoft Corporation, Redmond, WA (US)

(72) Inventors: Chesong Lee, Bellevue, WA (US); Raj Das, Kirkland, WA (US); Cornel Rat, Bothell, WA (US); William Tipton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 878 days.

(21) Appl. No.: 14/501,922

(22) Filed: Sep. 30, 2014

(65) Prior Publication Data
US 2016/0092467 A1   Mar. 31, 2016

(51) Int. Cl.
*G06F 12/00* (2006.01)
*G06F 17/30* (2006.01)
*G06F 11/10* (2006.01)

(52) U.S. Cl.
CPC .... *G06F 17/30203* (2013.01); *G06F 11/1004* (2013.01); *G06F 17/30082* (2013.01)

(58) Field of Classification Search
CPC ................................................. G06F 17/30203
USPC ......................................................... 707/827
See application file for complete search history.

(56) References Cited

U.S. PATENT DOCUMENTS

| 5,752,251 | A | 5/1998 | Cripps |
| 7,415,653 | B1 | 8/2008 | Bonwick et al. |
| 7,451,167 | B2 | 11/2008 | Bali et al. |
| 8,140,964 | B2 | 3/2012 | Cragun et al. |
| 8,386,835 | B2 | 2/2013 | Dilger et al. |
| 8,397,101 | B2 * | 3/2013 | Goss .................... G06F 11/1004 711/209 |
| 9,106,257 | B1 * | 8/2015 | Pohlack ................ H03M 13/09 |
| 9,183,246 | B2 | 11/2015 | Tipton et al. |
| 2005/0268341 | A1 * | 12/2005 | Ross ....................... G06F 21/64 726/26 |
| 2009/0024827 | A1 | 1/2009 | Davis |
| 2010/0228737 | A1 | 9/2010 | Riemers |

(Continued)

FOREIGN PATENT DOCUMENTS

EP    1396978 A2    3/2004

OTHER PUBLICATIONS

"WxChecksums 1.2.0 manual." 2004. 35 pages. http://wxchecksums.sourceforge.net/manual/en/manual.html.*

(Continued)

*Primary Examiner* — Kimberly Wilson
(74) *Attorney, Agent, or Firm* — Patent GC LLC (57) ABSTRACT

A file system allows a different checksum algorithm to be used for different extents of a file system object independently of other extents of the file system object. The checksum algorithm can be a selectable attribute of an extent or range of extents of a file system object, such that some extents of a file system object can use a first checksum algorithm, while other extents of the file system object can use a second checksum algorithm. An extent of the file system object also may have no associated checksum algorithm. The file system stores, for each extent of a file system object, data indicating a checksum for the extent and an indication of any checksum algorithm used for the extent.

20 Claims, 6 Drawing Sheets

(56) References Cited

U.S. PATENT DOCUMENTS

2010/0293142 A1 11/2010 Ackerman et al.
2016/0063018 A1 3/2016 Das et al.

OTHER PUBLICATIONS

Noam. "Powershell and .NET Forms. Write your own GUI—File Checksum Tool." 13 pages. https://scriptingblog.com/2014/05/07/powershell-and-net-forms-file-checksum-tool/.*
"International Search Report & Written Opinion Issued in PCT Patent Application No. PCT/US2015/052761", dated Nov. 24, 2015, 10 Pages.
"International Preliminary Report on Patentability Issued in PCT Patent Application No. PCT/US2015/052761", dated Sep. 23, 2016, 19 Pages.
Pace, Alberto, "Technologies for Large Data Management in Scientific Computing", Published on: Sep. 2013, Available at: https://cds.cern.ch/record/1630387/files/CERN-IT-2013-005.pdf.
Murray, Kate, "It's Not Just Integrity: Fixity Data in Digital Sound and Moving Image Files", Published on: Mar. 4, 2014, Available at: http://blogs.loc.gov/digitalpreservation/2014/03/its-not-just-integrity-fixity-data-in-digital-sound-and-moving-image-files/.

* cited by examiner

| Extent Identifier 302 | Storage location 304 | Checksum Algorithm 306 | Checksum value 308 | Other attributes 310 |
|---|---|---|---|---|
| | | | | |

FILE SYSTEM WITH PER-EXTENT CHECKSUMS

BACKGROUND

A file system in a computer generally is part of the operating system that manages access to data in files stored on one or more storage devices. The file system provides an interface through which other applications can create and manage file system objects, write data to files and read data from files stored on the storage devices.

Most file systems are configured to provide a level of data integrity. For example, a file system may compute and store checksums of the stored data when the data is written to a storage device. When data is read from the storage device, the checksums can be computed for the data as read and compared to the stored checksums. There are variety of checksum algorithms, which vary in terms of efficiency, computational complexity and storage overhead.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A file system allows a different checksum algorithm to be used for different extents of a file system object independently of other extents of the file system object. The checksum algorithm can be a selectable attribute of an extent or range of extents of a file system object, such that some extents of a file system object can use a first checksum algorithm, while other extents of the file system object can use a second checksum algorithm. An extent, or range of extents, of the file system object also may have no associated checksum algorithm. The file system stores, for each extent of a file system object, data indicating a checksum for the extent and an indication of any checksum algorithm used for that extent. Such data can be stored for a range of extents, thus applying it to each extent in the file system object.

A file system operation can be provided to allow an application to request a change to the checksum algorithm used for an extent of a file system object. When data is written to an extent of a file system object, the checksum is computed based on the checksum algorithm indicated for that extent, and the checksum is stored. When data is read from storage for an extent of a file system object, that checksum of the read data is computed based on the checksum algorithm indicated for that extent, and is compared to the stored checksum. Other operations affected by a per-extent checksum include, but are not limited to, operations for creating file system objects with such attributes, and providing and changing default settings for such attributes.

Different default settings can be provided for different parts of a file system object, such as for different file streams within a file. Such a setting for a file system object can be changed to and from using checksums, and among different checksum algorithms.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section describes an example implementation of a computer with a file system.

Figure 1:
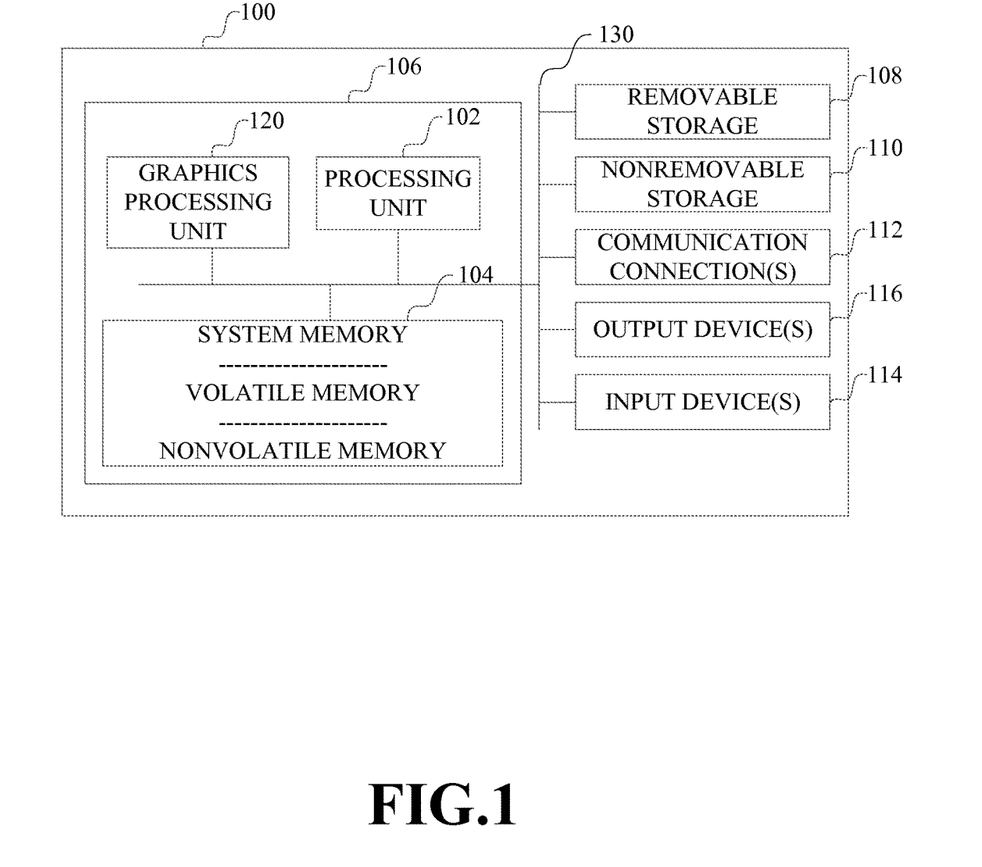
FIG. 1 is a block diagram of an example computer in which a file system can be implemented.

FIG. 1 illustrates an example computer with which a file system can be implemented. The computer can be any of a variety of general purpose or special purpose computing hardware configurations. Some examples of types of computers that can be used include, but are not limited to, personal computers, game consoles, set top boxes, handheld or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like. A particular example computer is a server computer supporting multiple virtual machines which access data on a storage array with multiple virtual hard drives.

With reference to FIG. 1, an example computer 100 includes at least one processing unit 102 and memory 104. The computer can have multiple processing units 102. A processing unit 102 can include one or more processing cores (not shown) that operate independently of each other. Additional co-processing units, such as graphics processing unit 120, also can be present in the computer. The memory 104 may be volatile (such as dynamic random access memory (DRAM) or other random access memory device), non-volatile (such as a read-only memory, flash memory, and the like) or some combination of the two. This configuration of memory is illustrated in FIG. 1 by dashed line 106. The computer 100 may include additional storage (removable and/or non-removable) including, but not limited to, magnetically-recorded or optically-recorded disks or tape. Such additional storage is illustrated in FIG. 1 by removable storage 108 and non-removable storage 110. The various components in FIG. 1 are generally interconnected by an interconnection mechanism, such as one or more buses 130.

A computer storage medium is any medium in which data can be stored in and retrieved from addressable physical storage locations by the computer. Computer storage media includes volatile and nonvolatile memory, and removable and non-removable storage media. Memory 104 and 106, removable storage 108 and non-removable storage 110 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. The computer storage media can include combinations of multiple storage devices, such as a storage array, which can be managed by an operating system or file system to appear to the computer as one or more volumes of storage. Computer storage media and communication media are mutually exclusive categories of media.

Computer 100 may also include communications connection(s) 112 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, radio frequency, infrared and other wireless media. Communications connections 112 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media, and may perform various functions with respect to that data.

Computer 100 may have various input device(s) 114 such as a keyboard, mouse, pen, camera, touch input device, sensor (e.g., accelerometer or gyroscope), and so on. Output device(s) 116 such as a display, speakers, a printer, and so on may also be included. All of these devices are well known in the art and need not be discussed at length here. The input and output devices can be part of a housing that contains the various components of the computer in FIG. 1, or can be separable from that housing and connected to the computer through various connection interfaces, such as a serial bus, wireless communication connection and the like. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, hover, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (such as electroencephalogram techniques and related methods).

The various storage 110, communication connections 112, output devices 116 and input devices 114 can be integrated within a housing with the rest of the computer, or can be connected through input/output interface devices on the computer, in which case the reference numbers 110, 112, 114 and 116 can indicate either the interface for connection to a device or the device itself as the case may be.

A computer generally includes an operating system, which is a computer program running on the computer that manages access to the various resources of the computer by applications. There may be multiple applications. The various resources include the memory, storage, input devices and output devices, such as display devices and input devices as shown in FIG. 1. A file system generally is implemented as part of an operating system of the computer, but can be distinct from the operating system. The file system may be practiced in distributed computing environments where operations are performed by multiple computers that are linked through a communications network. In a distributed computing environment, computer programs may be located in both local and remote computer storage media and can be executed by processing units of different computers.

The operating system, file system and applications can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Given one or more computers and one or more storage devices, whether a single computer, or a set of distributed computers, or one or more computers connected to distributed storage, a file system provides an abstraction layer between the details of managing the storage devices, such as the actual storage locations within each device where data is stored, and applications. This abstraction layer allows applications to identify files and access files using references to files and locations within the files, without the need for the application to have information about the actual storage locations on the storage devices or other details about the storage devices.

In some computers, multiple processing units are managed to run multiple virtual machines, where each virtual machine is defined by one or more data files. The storage devices also may be managed to provide multiple virtual hard drives (VHD). In such systems some of the data files, particularly those defining the virtual machines, can be very large. Some portions of the data file, e.g., certain VHD metadata for example, may be more important than other portions of the file.

By allowing different extents of a file to use different checksum algorithms, as described herein, the checksum algorithms can be selected more optimally based on the relative importance of the data in different portions of a file.

Such tailoring of the checksum algorithm to different extents of a file can provide more efficient storage utilization and better performance.

An implementation of a file system which allows different extents of a file to use different checksum algorithms will now be described in more detail.

In a file system, references to files are defined as combinations of various file system objects, such as a name of a storage device or collection of storage devices, names of directories and paths of directories, names of file streams and files, or other types of file system objects. Each file system object generally is a named construct that represents data stored within the file system.

Within the file system, when data for a file is stored, it generally is broken into small chunks (often called blocks) which are stored in storage locations on the storage device. The file system generally tracks, for each file, the storage locations within the storage device where each block of a file is stored, and the ordering of those blocks. A file system also can define clusters, which is a group of blocks, and some operations can be limited to operations performed on clusters instead of groups of blocks. Herein, the term "extent" is used to mean any division of a file, such as a block or cluster. In addition to tracking storage locations where stored data for each extent of a file is stored, the file system tracks a checksum computed, and checksum algorithm, for each extent. The checksum information, i.e., the computed checksum and an indication of the checksum algorithm, can be stored for a range of extents, or subregions of an extent, depending on the implementation.

An example implementation of such a file system will now be described. In the following description of FIGS. 2 through 8, a block of storage is used as the example granularity of storage operations. It should be understood that the following can be applied to using any extent, or range of extents, of a file, such as a block, cluster or other subset of storage depending on conventions used by the storage devices, processing units, operating systems and file systems involved.

Figure 2:
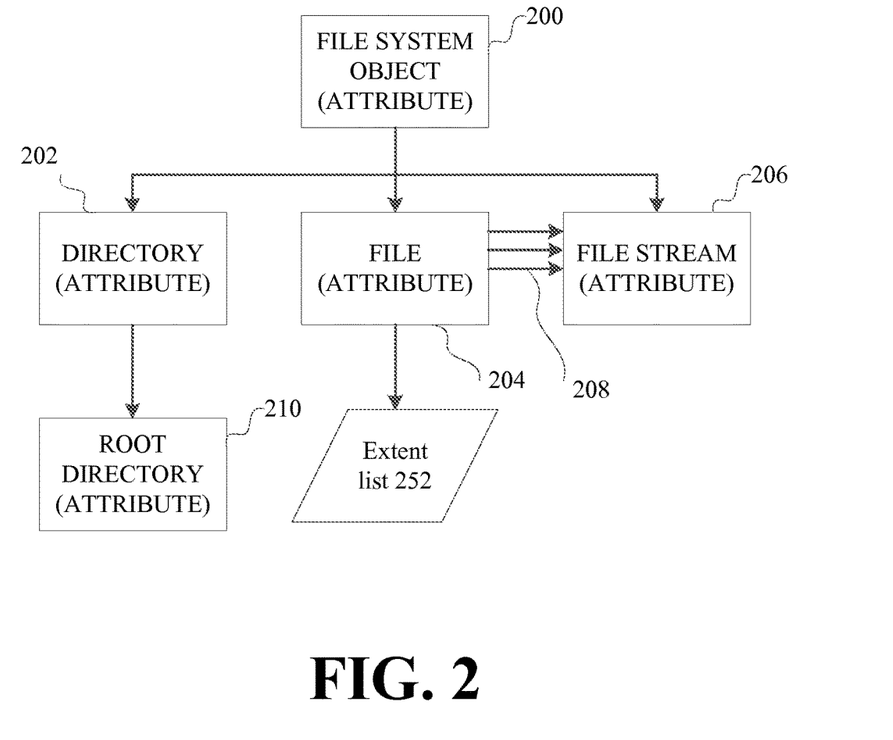
FIG. 2 is a diagram of an example class hierarchy of file system objects.

Referring to FIG. 2 as an example implementation, the file system generally defines a set of different kinds of file system objects 200, such as a directory 202, a file 204 and file streams 206. A file 204 can include a collection of file streams 206 as indicated at 208. For example, a file can include a metadata file stream and a data file stream. A root directory 210 is a special kind of directory 202, providing the top level directory of a volume being managed. The volume governed by the root directory can include a plurality of storage devices or a portion of a storage device, but for illustration purposes only the description herein will refer to singular storage device.

Each file system object also can have one or more attributes, such as a name and other attributes that depend on the implementation of the file system. The attributes of a first file system object can include default settings for other file system objects which are created and dependent on the first file system object. For example, attributes of a directory can define default settings for files and file streams created within that directory. Similarly, attributes of a file can define default settings for file streams included within that file.

A file, file stream or other similar object can also include an extent table 252 that lists, for each extent (such as a cluster or block or other subset of storage) of the file or file stream, various information about that extent, such as its location in storage, and other data such as attributes of an extent.

The extent table can be stored in a number of ways. For example, in some implementations, the extent table can be a simple list or array of information about blocks, mapping a virtual block identifier used by the file to a logical block identifier used to refer to a storage location on a storage device. As another example, in some implementations the extent table can be stored in an indexed tree structure such as a B+ tree, using a virtual cluster number as a key and a logical cluster number as a value. Other data, such as attributes of an extent, can be stored for each extent in such data structures.

While the foregoing describes a file system that has file system objects within an object class hierarchy, other implementations of file systems using other types of data structures to represent file system structures also can be used, and the invention is not limited to the object types described above, or to an object-oriented implementation. The term "file system object" is intended to mean any implementation of a file system structure, such as a root directory, file or the like, depending on the file system, and is not limited to object-oriented implementations.

In general, a file system allows applications and users to create, within a root directory for a storage volume, multiple directories and other file objects within those directories, which creates a directory tree. The name of a storage volume, and the list of names of directories containing a file system object, is called a path. A computer program accesses a file system object through the file system by providing to the file system the path that contains the desired file system object and the name of the file system object. Note that a volume can refer to the storage locations available in a storage device, or in a portion of a storage device, or in multiple storage devices, depending on the implementation.

A file system makes available to other computer programs a variety of operations, typically through a programming interface such as function calls and the like, which operations allow storage to be accessed. A file system may include operations that initialize a storage device (also called a "volume" herein) for use, and operations that create, read, write or update, or delete file objects. A computer program performs operations on a file system object by specifying the operation and the path and name for the file system object on which the operation is to be performed.

To allow the checksum algorithm to be different for different extents of a file, the file system uses the extent table 252 for a file system object to store an indication of the checksum algorithms, if any, used for extents of the file. For example, this indication can be stored as an attribute of the extent in the extent table. Alternatively, this indication can be indirectly accessed through the extent table, for example by being stored in association with the storage subsystem data for the storage location of the stored data for the extent. As another example, ranges of extents can be defined and this information can be stored for ranges of extents.

An example implementation of an extent table 252 with per-extent checksum information will now be described in connection with FIG. 3.

Figure 3:
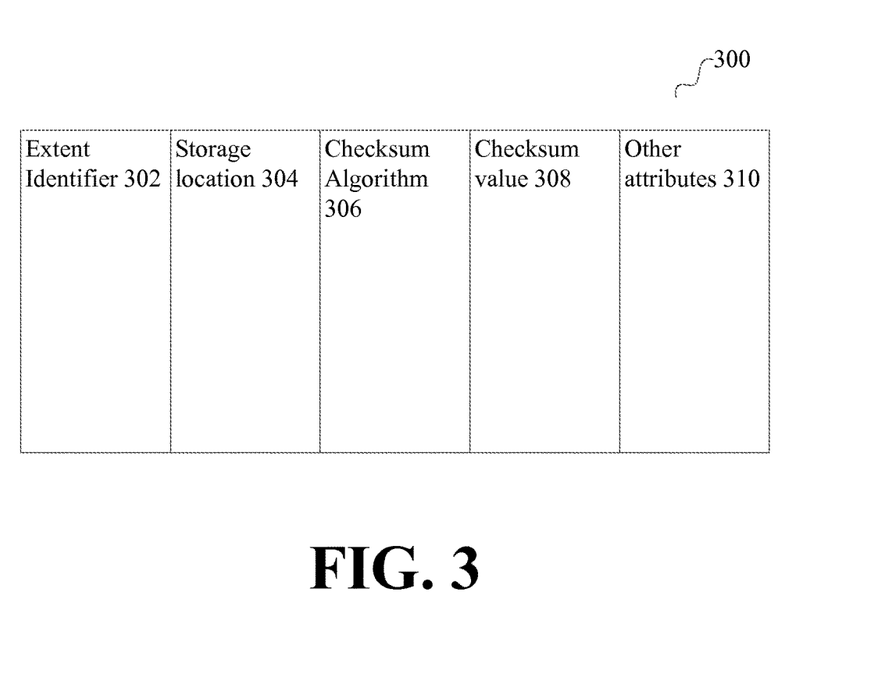
FIG. 3 is a diagram of an example extent table using per-extent checksums.

An extent table 300 for a file system object that stores data in extents, such as a file or file stream, as shown in FIG. 3, can be implemented as an array, list or other indexed data structure. The extent table is can be indexed based on an extent identifier 302 for each extent in the file system object. Extent identifiers generally are assigned sequentially within the file and thus indicate the order of data in the file. These extent identifiers generally are mapped to storage locations 304 on storage devices. The storage locations 304 may themselves be identifiers used by a storage subsystem to uniquely identify an addressable portion of storage within the storage subsystem.

The extent table 300 can includes, for each extent, a checksum indicator 306, which is a value indicating which checksum algorithm, if any, is used to compute a checksum for the extent. The value can be, for example, an integer value that the file system in turn maps to a checksum algorithm. One value can be set to indicate that no checksum algorithm is used (e.g., 0 or −1 or some "null" value indicator). The computer program implementing the file system can use a variety of techniques to use the checksum indicator 306 to switch to executing the corresponding checksum algorithm. In general, the file system includes computer programs that, when executed by a computer, can implement at least two different checksum algorithms.

There are many checksum algorithms that can be used. The following is a non-exhaustive, illustrative list of example checksum algorithms useful for such a file system: longitudinal parity, modular sum, Fletcher checksum, Adler checksum, cyclic redundancy, and hash functions such as MD5 and SHA variants.

The extent table 300 also can include, for each extent, a checksum value 308, which is a value that is a result of computing the checksum algorithm corresponding to the checksum indicator 306 on the data stored at the storage location 304 for the extent.

The extent table 300 also can include, for each extent, other attributes 310 of the extent.

Alternatively, the various values 304, 306, 308 and 310 may be stored in one or more tables indexed by the extent identifier, depending on the implementation. For example, the checksum values 308 may vary in size depending on the checksum algorithm used. By storing checksum values 308 in a separate table, or even a different extent in the storage subsystem, management of storage for the checksum values can be separated from management of storage of the rest of the extent table. Alternatively, the extent table can be allocated such that the size of the checksum value field is fixed to the largest possible size. Alternatively, the checksum value 308 can be an indicator of where the checksum value is stored. As another alternative, the checksum values and checksum algorithm can be stored with respect to the storage system identifiers for the extent, and such information can be tracked with respect to the storage subsystem instead of a file system object. Thus, the file system can identify the checksum used for an extent of a file system object either directly in the extent table or indirectly through the extent table. Alternatively, information about checksum algorithms used for a file system object can be stored in relation to ranges of extents of the file system object.

Given an extent table through which a checksum value and checksum algorithm for an extent can be stored and determined, a file system operation also is provided to allow the checksum algorithm for a given extent, or a range of extents, of a file system object to be changed. Such a change to the checksum algorithm for an extent, or range of extents, of a file can be made independently of other extents of the file. The file system operation is generally invoked by an application, but could be input by a user in a command line interface or in a graphical user interface in which a user selects. A computer program also can be written that manipulates a file system object to change checksum algorithms used within the file system object. An example implementation of such operation, which assumes the operation receives an indication of the file system object, the extent, or range of extents, to be changed, and an indication of the checksum algorithm, will be described in connection with FIG. 4. A user interface can be provided to communicate to the user available checksum algorithms and to allow the user to select from among the available checksum algorithms for particular regions of a file.

Figure 4:
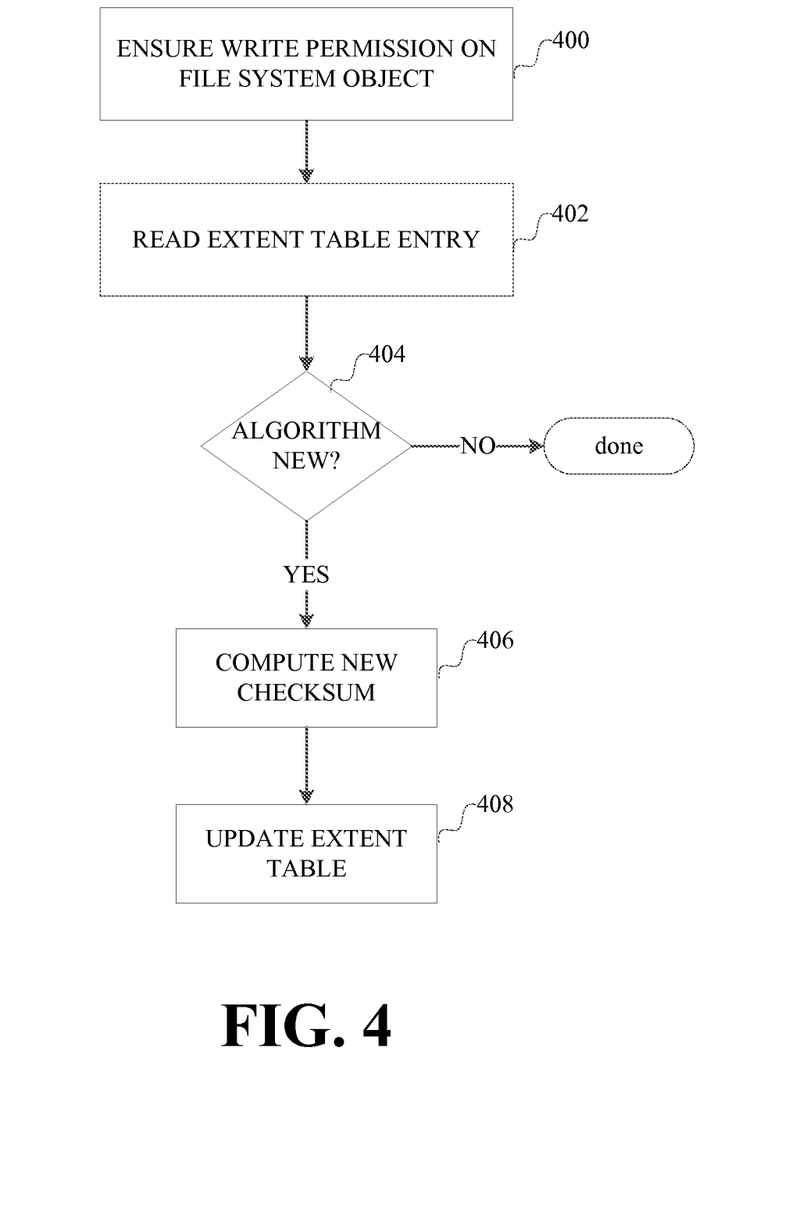
FIG. 4 is a flow chart describing an example implementation of changing a checksum algorithm used for an extent of a file system object.

As shown in FIG. 4, in response to invoking the operation to change the checksum algorithm for an extent of a file system object, the file system ensures 400 that the caller has write permission for the file system object. If there are otherwise no errors with the input parameters, then the file system reads 402 the extent table entry for the extent to be changed. If the checksum algorithm indicated by the invoked operation is already in use for that extent, as determined at 404, then the process ends. The data for the extent is read from storage (optionally verifying the current checksum) and a checksum using the new checksum algorithm is computed 406. The new checksum value and an indicator of the new checksum algorithm are then stored 408. Such an operation can be defined for a range of extents by repeating the processing of 400 through 408 for each extent in a given range of extents. It is possible that changing the checksum algorithm for a range of extents may result in a current range of extents being subdivided into multiple ranges, each having a different checksum algorithm.

Given such an implementation of checksums in a file system, a variety of other operations can be modified to support this usage. For example, reading and writing of data can be dependent on the checksum algorithm used for any given extent of a file. Also, higher level file management operations can be provided that change the checksum algorithm used for different sections of a file to provide different levels of protection. In some implementations, and operation can be defined that specifies a checksum algorithm to be used for extents of a file system object which have yet to be allocated and stored. When data is ultimately written to such extents, the checksum algorithm to be used can be predefined. This set of operations is not intended to be exhaustive, but merely illustrative of the kinds of operations that can be implemented differently depending on whether the file system supports sharing of stored data among file system objects. Any such operations can be defined for a single extent or for a range of extents. The range of extents can also include extents that have not yet been allocated for the file system object.

Figure 5:
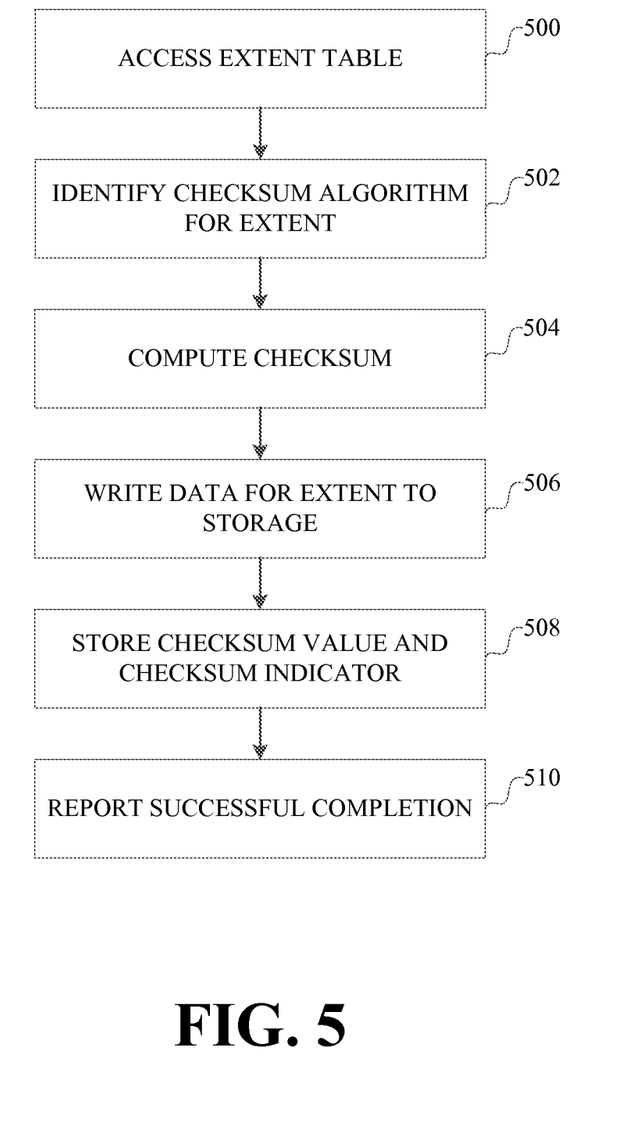
FIG. 5 is a flow chart describing an example implementation of writing data to a file system object.

Writing data to a file system object will now be described in connection with FIG. 5. When data is to be written to an extent in a file system object, the file system accesses 500 the extent table for the data about the extent. The file system identifies 502 the checksum algorithm, if any, to be used for the extent. If there is a checksum algorithm used for this extent, then the file system computes 504 the checksum for the data to be written using the identified checksum algorithm. Otherwise, a checksum computation can be avoided. The file system writes 506 the data for that extent to storage, and updates the storage location for the extent if appropriate. The file system also stores 508 the checksum value computed for the extent and, if not already stored, an indication of the checksum algorithm used. If successful, the file system responds 510 with an indication of a successful write operation; otherwise a failure of any of the foregoing steps can cause an error to be signaled.

In some instances, the write operation is appending new data to a file. In such a case, the file system adds an entry to the extent table for the new extent. At the time of, or prior to, adding the entry, the file system can set the checksum algorithm to be used in a number of ways. The checksum algorithm can be a parameter of the append operation. The checksum algorithm can be determined by default according to an attribute of the file or an attribute inherited from another file system object. The checksum algorithm can be selected based on the immediately preceding extent in the file system object. The checksum algorithm can be selected based on the extent in the storage subsystem into which the data is being written.

The checksum algorithm for a range of extents outside the allocation of the current file system object can be specified prior to the data for the extent actually being appended to the file system object. For example, an empty file can be created, but with a range of extents having a specified checksum algorithm. The end of the file can be set to include the range. As data is written to the file using extending writes, the file gradually expands and checksums are computed for the data stored in the specified range of extents.

In some instances, the write operation may involve reading and modifying currently stored data. The currently stored checksum algorithm and checksum value for the currently stored data can be verified before the write operation to ensure the currently stored data, as read, is correct before modification.

In some instances, the write operation may be a "write to new" or "copy on write" operation, or similar operation which results in the data for the extent being written to a new storage location. If the extent table tracks checksum values and checksum algorithms indirectly, for example by having such values stored for each storage location of the volume, then such data can be updated for the new storage location.

Figure 6:
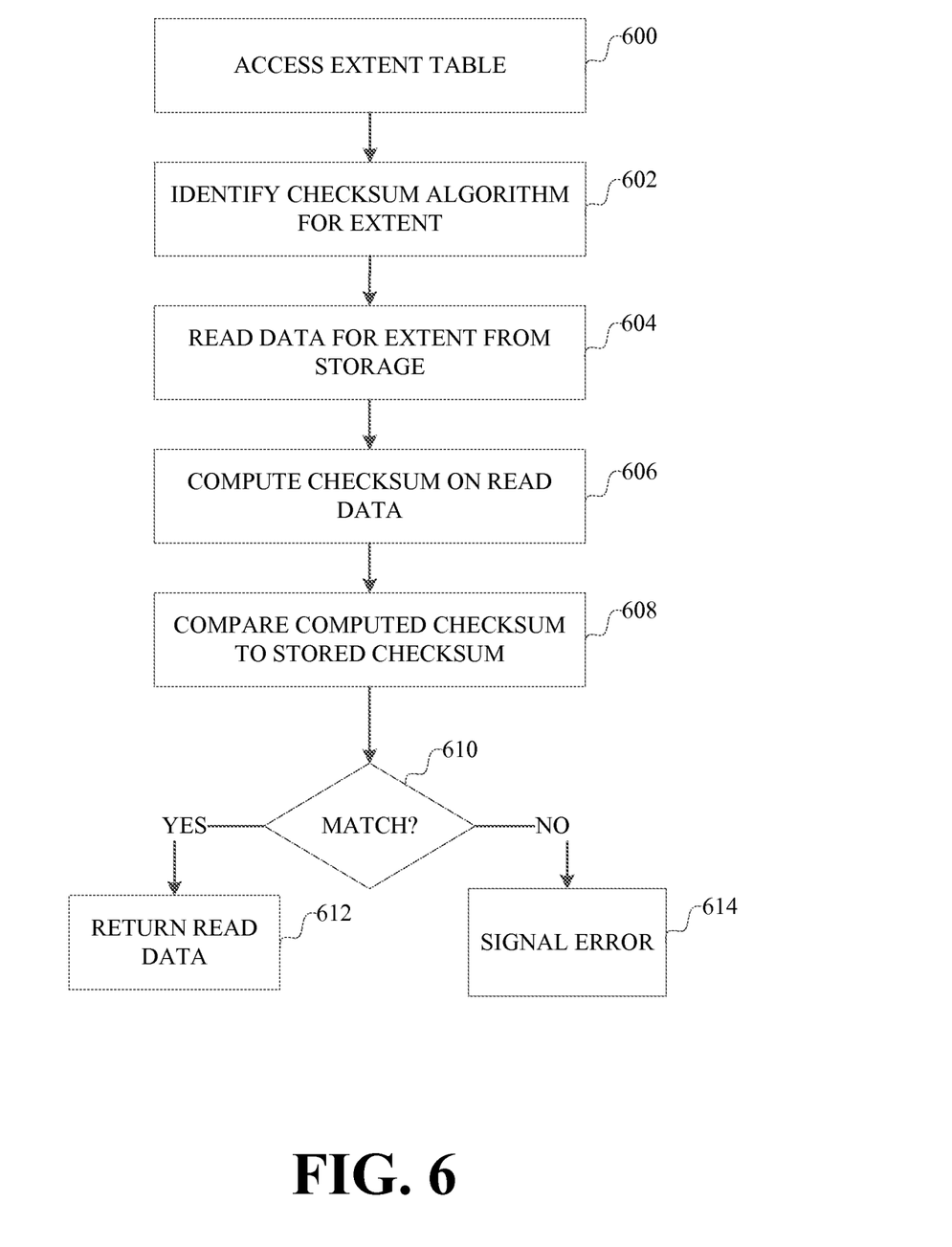
FIG. 6 is a flow chart describing an example implementation of reading data from a file system object.

Reading data from a file system object will now be described in connection with FIG. 6. A read operation generally involves accessing 600 the extent table for data about the extent. The file system identifies 602 the checksum algorithm used for the extent. The file system reads 604 the data from the storage subsystem using the storage location for the extent. A checksum for the read data is then computed 606 using the identified checksum algorithm. The computer checksum is compared 608 to the previously stored checksum. If the checksums match, as indicated at 610, then the read data is returned 612; otherwise an error can be signaled as noted at 614.

Using such a file system, different portions of a file can use different checksum algorithms, and can have these checksum algorithms changed independently of other portions of the file. The capability is particularly advantageous, for example, in storage systems with large files in which different regions of stored data have different levels of importance. A specific example is in a data center with a virtual hard drive (VHD) where a file may include important metadata in one region and less important other data in another region. By supporting files that allow different extents to use different checksums, the file system advantageously supports an improved tradeoff between performance and protection for such files. For example, extents in a file that store VHD metadata can be assigned one checksum algorithm, which may take longer to compute or result in a larger checksum value than another checksum algorithm assigned to other extents in the file that store other VHD data. Similarly, a file with one combination of checksum algorithms can be changed to use another combination of checksum algorithms.

An example implementation of an operation that changes protections applied to a file system object will now be described in connection with FIG. 7.

In this example operation, an application can make repeated calls to a file system operation that changes the checksum applied to a designated extent of a designated file. Alternatively the file system can also include an operation that receive an indication of a file, different ranges within the file and an indication of the different checksum algorithms to be applied to the extents within the different ranges.

Figure 7:
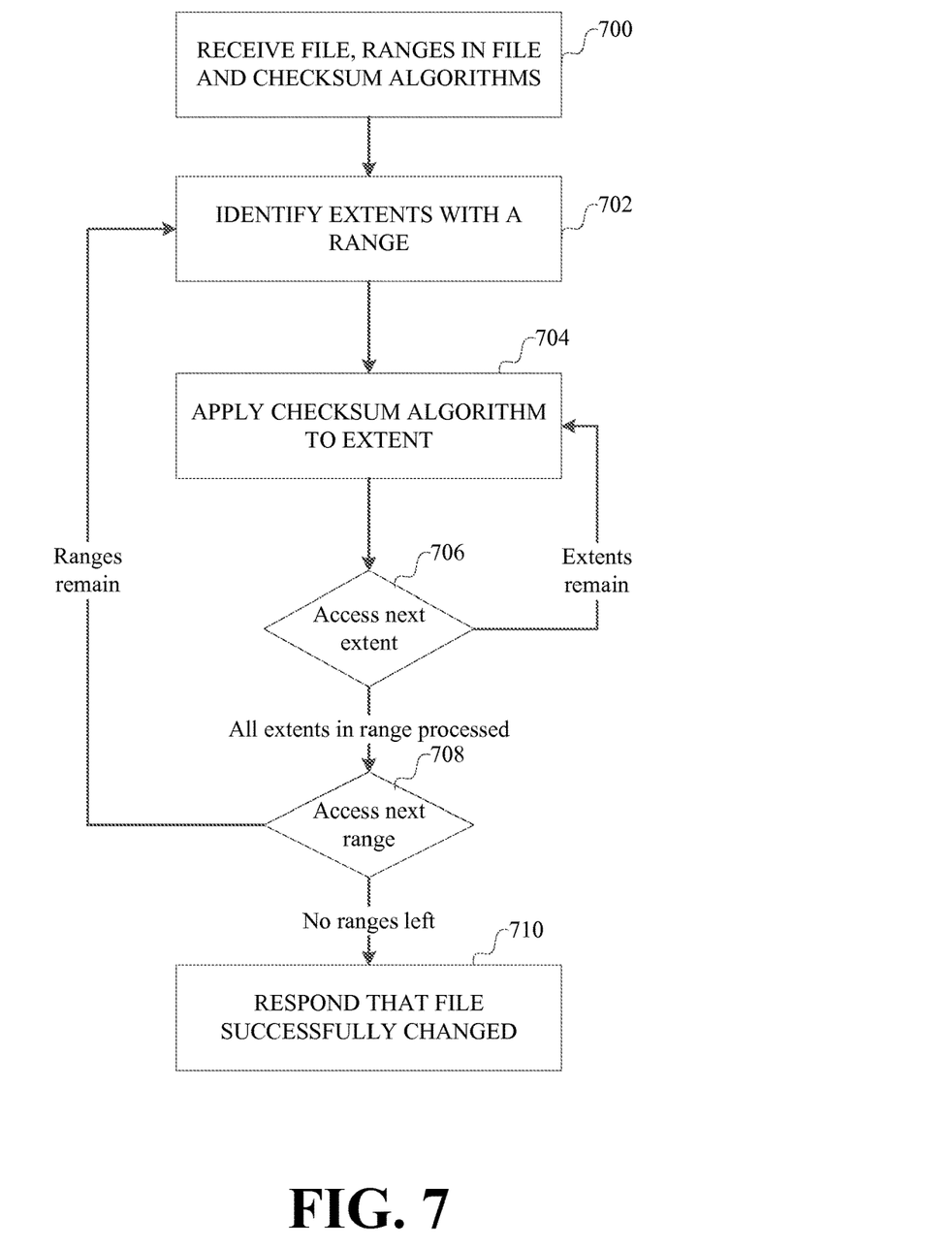
FIG. 7 is a flow chart describing an example implementation of changing the protections applied to a file system object.

Thus, in FIG. 7, the file system receives 700 an indication of a file, ranges within the file and different checksum algorithms to be applied to the extents within the different ranges. Given a range, extents within the range are identified 702. The new checksum algorithm, as designated for extent in the current range of the file being processed, is applied 704 to each extent, in a manner such as described in FIG. 4. If all extents of that range are processed, as determined at 706, then the next range of the file is processed, as indicated at 702, until all ranges are processed, as determined at 708. If successful, the application responds 710 with an indication of a successful change to the file.

It should be understood that a variety of other operations can be provided to access and manage file system objects that utilize different checksum algorithms for different extents within the file system objects. The foregoing provides a set of illustrative example implementations for such a file system.

By having an extent, or a range of extents, to have a checksum algorithm changed, or not used, it is possible to dynamically change the checksum algorithm for an extent temporarily. As a particular example, to write data to an extent, the extent can be set to have data written in place, and can be set to have no checksum. After the write is complete, the checksum algorithm can be set and the checksum is then computed. More specifically, when a write occurs to an extent that is marked as having checksums, the application can write to a given range, and the file system writes an intent log record that states that that the data in that range is being overwritten. The write takes place in the original media extent. The checksum value then can be computed and stored. If some error occurs prior to the checksum being computed, such as a crash, cluster failover, or other failure, then the checksum can be addressed as part of file system recovery. Because the intent log recorded that the data was being overwritten in the range, it is assumed that the correct checksum for this range is now unknown. The range is then temporarily marked as having no checksum. Later, if an application or the file system reads or writes this range, then the data stored in this range is then presumed to be correct and the checksum for the range is then computed and stored and the range is marked as having a checksum.

Such a file system advantageously supports having files with different checksums applied to different extents which can provide a better tradeoff between protection, storage utilization and performance.

Accordingly, in one aspect a computer with a file system includes a means for tracking, for an extent of a file system object, a checksum algorithm applied to the extent from among a plurality of different checksum algorithms. Such a file system can include a means for changing the checksum algorithm applied to an extent of the file system object independently of other extents of the file system object.

In another aspect, a computer with a file system includes a means for changing the checksum algorithm applied to an extent of the file system object independently of other extents of the file system object, wherein the checksum algorithm applied to the extent is selected from among a plurality of different checksum algorithms.

In another aspect, a computer with a file system includes storage including, for different extents of a file system object, an indication of checksum algorithm applied to the extents from among a plurality of different checksum algorithms.

In another aspect, a computer-implemented process performed by a file system of a computer includes receiving an indication of checksum algorithm applied to an extent, from among a plurality of different checksum algorithms, and applying the checksum algorithm to stored data for the extent independently of other extents of the file system object.

In another aspect, an article of manufacture includes a storage medium, with computer program code stored in the storage medium that, when executed by one or more computers, configures the one or more computers to receive an indication of checksum algorithm applied to an extent, from among a plurality of different checksum algorithms, and apply the checksum algorithm to stored data for the extent independently of other extents of the file system object.

In any of the foregoing aspects, in response to a write operation to an extent of a file system object, the file system identifies a checksum algorithm to apply to the extent, computes a checksum value for the extent using the checksum algorithm, and stores an indication of the checksum algorithm and the checksum value associated with the extent.

In any of the foregoing aspects, in response to a read operation for an extent of a file system object, the file system identifies a checksum algorithm applied to the extent, computes a checksum value for data read from storage for the extent using the checksum algorithm, and compares the computed checksum value to a stored checksum value for the extent.

In any of the foregoing aspects, in response to an operation to change a checksum algorithm applied to an extent of a file, a file system computes a checksum value for data read from storage for the extent using the checksum algorithm, and stores an indication of the checksum algorithm and the checksum value associated with the extent.

In any of the foregoing aspects, a checksum indicator can be stored for each extent of a file system object indicating a checksum algorithm applied to the extent, where the checksum algorithm is selected from among a plurality of checksum algorithms.

In any of the foregoing aspects, a checksum value can be stored for each extent of a file system object indicating the checksum value computed for the stored data for the extent.

In any of the foregoing aspects, the checksum indicator for an extent can be stored in an entry for the extent in an extent table for the file system object.

In any of the foregoing aspects, the checksum value for an extent can be stored in an entry for the extent in an extent table for the file system object.

In any of the foregoing aspects, the checksum indicator for an extent can be accessed indirectly through an entry for the extent in the extent table for the file system object.

In any of the foregoing aspects, the checksum value for an extent can be accessed indirectly through an entry for the extent in the extent table for the file system object.

In any of the foregoing aspects, the checksum indicator for an extent of a file system object is stored in association with data about the storage location of stored data for the extent.

In any of the foregoing aspects, the checksum value for an extent of a file system object is stored in association with data about the storage location of stored data for the extent.

In any of the foregoing aspects, the checksum algorithm for an extent of a file system object can be removed in the event of a failure of a write operation. Upon a later access to that extent, the checksum algorithm can be reassigned to the extent, and the checksum value can be computed and stored.

Any of the foregoing aspects may be embodied in one or more computers, as any individual component of such a computer, as a process performed by one or more computers or any individual component of such a computer, or as an article of manufacture including computer storage with computer program instructions are stored and which, when processed by one or more computers, configure the one or more computers.

Any or all of the aforementioned alternate embodiments described herein may be used in any combination desired to form additional hybrid embodiments. Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. It should be understood that the subject matter defined in the appended claims is not necessarily limited to the specific implementations described above. The specific implementations described above are disclosed as examples only.

What is claimed is:

1. A computer including a file system and configured to manage storage of and access to a plurality of file system objects of the file system on one or more storage devices, the computer comprising:
    a computer storage medium storing a data structure, for each file system object, comprising, for each extent of a plurality of extents of the respective file system object, an indication of a checksum algorithm applied to the extent selected from among a plurality of different checksum algorithms and a checksum value for the extent, allowing a first range of extents of a file system object to have a checksum algorithm different from a second range of extents in the file system object;
    a processing system comprising a memory with computer program code for the file system stored in the memory that, when executed by the processing system, configures the processing system to provide an interface through which file system operations of accessing a file system object and changing a checksum algorithm can be invoked, the file system:
    in response to receiving an invocation of the operation to change a checksum algorithm applied to a selected extent of a selected file system object to a selected new checksum algorithm:
        receive data indicating the selected file system object, the selected extent and the selected new checksum algorithm from among the plurality of different checksum algorithms,
        compute a checksum value for data read from storage for the selected extent using the selected new checksum algorithm, and
        store, in the computer storage medium in the data structure for the selected extent, an indication of the selected new checksum algorithm and the computed checksum value for the selected extent, such that the selected extent has a different checksum algorithm than another extent in the file system object; and in response to receiving, from an application, an invocation of the operation to access a selected file system object, for each extent of the file system object to be accessed;
    access an indication of the checksum algorithm applied to the extent from the data structure for the extent stored in the computer storage medium,
    apply the checksum algorithm, indicated in the data structure for the extent, to the data for the extent to compute a checksum value for the extent.

2. The computer of claim 1, wherein the file system, in response to a write operation to an extent of a file system object, identifies a checksum algorithm to apply to the extent, computes a checksum value for the extent using the identified checksum algorithm, and stores, in the computer storage medium and in association with the extent, an indication of the identified checksum algorithm and the computed checksum value for the extent.

3. The computer of claim 1, wherein the file system, in response to a read operation for an extent of a file system object, identifies from the data stored in the computer storage medium a checksum algorithm applied to the extent, computes a checksum value for data read from storage for the extent using the checksum algorithm, and compares the computed checksum value to a checksum value stored in the computer storage medium for the extent.

4. The computer of claim 1, wherein the indication of the checksum algorithm stored in the computer storage medium is a checksum indicator stored in an entry for the extent in an extent table for the file system object.

5. The computer of claim 4, wherein the checksum value for an extent is stored in the computer storage medium in the entry for the extent in the extent table for the file system object.

6. The computer of claim 1, wherein the indication of the checksum algorithm stored in the computer storage medium is a checksum indicator for an extent accessed indirectly through an entry for the extent in the extent table for the file system object.

7. The computer of claim 6, wherein the checksum value for an extent is accessed indirectly through the entry for the extent in the extent table for the file system object.

8. The computer of claim 1, wherein the indication of the checksum algorithm stored in the computer storage medium is a checksum indicator for an extent stored in association with data indicating a storage location of stored data for the extent.

9. The computer of claim 1, wherein the checksum value for an extent of a file system object is stored in association with data indicating a storage location of stored data for the extent.

10. The computer of claim 1, wherein a file system object includes a first extent including metadata for the file system object, and a second extent including data stored by the file system object, wherein the checksum algorithm for the first extent is different from the checksum algorithm for the second extent.

11. A computer-implemented process performed by a file system of a computer configured to manage storage of and access to a plurality of file system objects of the file system on one or more storage devices, the file system having an interface through which file system operations of accessing a file system object and changing a checksum algorithm can be invoked, the process comprising:
    storing, in a computer storage medium, a data structure, for each file system object, comprising, for each extent of a plurality of extents for the respective file system object, an indication of a checksum algorithm applied to the extent selected from among a plurality of different checksum algorithms, and a checksum value for the extent, allowing a first range of extents of the file system object to have a checksum algorithm different from a second range of extents of the file system object;
    in response to receiving an invocation of the operation to change a checksum algorithm applied to a selected extent of a selected file system object to a new selected checksum algorithm:
        receiving data indicating the selected file system object, the selected extent, and the selected new checksum algorithm from among the plurality of different checksum algorithms,
        computing a checksum value for data read from storage for the selected extent using the selected new checksum algorithm, and
        storing, in the computer storage medium in the data structure for the selected extent, an indication of the selected new checksum algorithm and the computed checksum value for the selected extent, such that the selected extent has a different checksum algorithm than another extent in the file system object; and
    in response to receiving, from an application, an invocation of the operation to access an extent of a selected file system object:
        accessing an indication of the checksum algorithm applied to the extent from the data structure for the extent stored on the computer storage medium, and
        applying the checksum algorithm, indicated in the data structure for the extent, to data for the extent to compute a checksum value for the extent.

12. The computer-implemented process of claim 11, wherein, in response to the request including a write operation to an extent of a file system object:
    identifying a checksum algorithm to apply to the extent,
    computing a checksum value for the extent using the checksum algorithm, and
    storing, in the computer storage medium and in association with the extent, an indication of the checksum algorithm and the checksum value computed for the extent.

13. The computer-implemented process of claim 11, wherein, in response to the request including a read operation for an extent of a file system object:
    identifying a checksum algorithm applied to the extent and a stored checksum value for the extent from the data stored in the computer storage medium,
    computing a checksum value for data read from storage for the extent using the checksum algorithm, and
    comparing the computed checksum value to the stored checksum value for the extent from the computer storage medium.

14. The computer-implemented process of claim 11, wherein the indication of the checksum algorithm stored in the computer storage medium is a checksum indicator stored in an entry for the extent in an extent table for the file system object, and wherein the checksum value for the extent is stored in the entry for the extent in the extent table for the file system object.

15. The computer-implemented process of claim 11, wherein a file system object includes a first extent including metadata for the file system object, and a second extent including data stored by the file system object, wherein the checksum algorithm for the first extent is different from the checksum algorithm for the second extent.

16. An article of manufacture including a storage medium, with computer program code stored in the storage medium that, when executed by a computer, configures the computer to provide a file system for the computer configured to manage storage of and access to a plurality of file system objects of the file system on one or more storage devices having an interface through which file system operations of accessing a file system object and changing a checksum algorithm can be invoked, the file system being configured to:

store, in a computer storage medium, a data structure, for each file system object, comprising, for each extent of a plurality of extents for the file system object, an indication of a checksum algorithm applied to the extent selected from among a plurality of different checksum algorithms, and a checksum value for the extent allowing a first range of extents of a file system object to have a checksum algorithm different from a second range of extents in the file system object;

in response to receiving an invocation of the operation to change a checksum algorithm applied to a selected extent of a selected file system object to a new selected checksum algorithm:

receive data indicating the selected file system object, the selected extent, and the selected new checksum algorithm from among the plurality of different checksum algorithms,         compute a checksum value for data read from storage for the selected extent using selected new checksum algorithm, and         store in the computer storage medium in the data structure for the selected extent, an indication of the selected new checksum algorithm and the computed checksum value for the selected extent, such that the selected extent has a different checksum algorithm than another extent in the file system object; and     in response to receiving, from an application, an invocation of the operation to access an extent of a selected file system object:

accessing an indication of the checksum algorithm applied to the extent from the data structure for the extent stored on the computer storage medium, and         apply the checksum algorithm, indicated in the data structure for the extent, to data for the extent to compute a checksum value for the extent.

17. The article of manufacture of claim 16, wherein the one or more computers are configured to, in response to the request including a write operation to an extent of a file system object:

identifying a checksum algorithm to apply to the extent,     computing a checksum value for the extent using the checksum algorithm, and     storing, in the computer storage medium and in association with the extent, an indication of the checksum algorithm and the checksum value computed for the extent.

18. The article of manufacture of claim 16, the one or more computers are configured to, in response to the request including a read operation for an extent of a file system object:

identifying a checksum algorithm applied to the extent and a stored checksum value for the extent from the data stored in the computer storage medium,     computing a checksum value for data read from storage for the extent using the checksum algorithm, and     comparing the computed checksum value to the stored checksum value for the extent from the computer storage medium.

19. The article of manufacture of claim 16, wherein the indication of the checksum algorithm stored in the computer storage medium is a checksum indicator stored in an entry for the extent in an extent table for the file system object, and wherein the checksum value for the extent is stored in the entry for the extent in the extent table for the file system object.

20. The article of manufacture of claim 16, wherein a file system object includes a first extent including metadata for the file system object, and a second extent including data stored by the file system object, wherein the checksum algorithm for the first extent is different from the checksum algorithm for the second extent.

* * * * *